US011298704B2

(12) United States Patent
Lindner

(10) Patent No.: US 11,298,704 B2
(45) Date of Patent: Apr. 12, 2022

(54) STATIONARY WASTE COMMINUTING DEVICE HAVING AN ENERGY ACCUMULATOR

(71) Applicant: Manuel Lindner, Spittal/Drau (AT)

(72) Inventor: Manuel Lindner, Spittal/Drau (AT)

( * ) Notice: Subject to any disclaimer, the term of this patent is extended or adjusted under 35 U.S.C. 154(b) by 190 days.

(21) Appl. No.: 16/306,457

(22) PCT Filed: May 23, 2017

(86) PCT No.: PCT/EP2017/062401
§ 371 (c)(1),
(2) Date: Nov. 30, 2018

(87) PCT Pub. No.: WO2017/207349
PCT Pub. Date: Dec. 7, 2017

(65) Prior Publication Data
US 2019/0151857 A1 May 23, 2019

(30) Foreign Application Priority Data
Jun. 1, 2016 (EP) .................................... 16172397

(51) Int. Cl.
*B02C 18/24* (2006.01)
*B02C 4/42* (2006.01)
*B02C 18/14* (2006.01)
*B02C 13/30* (2006.01)
(Continued)

(52) U.S. Cl.
CPC ................ *B02C 18/24* (2013.01); *B02C 4/42* (2013.01); *B02C 13/30* (2013.01); *B02C 18/14* (2013.01); *B02C 25/00* (2013.01); *H02M 1/4225* (2013.01)

(58) Field of Classification Search
CPC .......... B02C 18/42; B02C 13/30; B02C 25/00
See application file for complete search history.

(56) References Cited

U.S. PATENT DOCUMENTS 7,556,212 B1 * 7/2009 Huang ................ B02C 18/0007 241/33
9,125,347 B2 * 9/2015 Morey ................... A01G 3/002
9,393,570 B2 * 7/2016 Schwelling ............. B02C 25/00
(Continued)

FOREIGN PATENT DOCUMENTS

CN 102186694 A 9/2011
CN 203494553 U 3/2014
(Continued)

OTHER PUBLICATIONS

Chinese Search Report issued by the China National Intellectual Property Administration for corresponding Chinese Patent Application No. 2017800345189 dated May 24, 2020, 3 pages.
(Continued)

*Primary Examiner* — Faye Francis
(74) *Attorney, Agent, or Firm* — Moore & Van Allen PLLC; Henry B. Ward, III

(57) ABSTRACT

The waste shredding device includes at least one shredding shaft, an electric motor for driving the at least one shredding shaft, a mains connection for supplying the electric motor with electrical energy and an energy store for storing energy and for at least partially supplying the electric motor with electrical energy, in particular for covering power peaks. Furthermore, a corresponding method for operating the waste shredding device.

18 Claims, 4 Drawing Sheets

(51) Int. Cl.

| | |
|---|---|
| ***B02C 25/00*** | (2006.01) |
| ***H02M 1/42*** | (2007.01) |

(56) References Cited

U.S. PATENT DOCUMENTS

| | | | |
|---|---|---|---|
| 2007/0164139 A1 | 7/2007 | Lipowski | |
| 2011/0062260 A1 | 3/2011 | Pan | |
| 2011/0169273 A1 | 7/2011 | Martin | |
| 2011/0240778 A1 | 10/2011 | Yamamoto et al. | |
| 2012/0234949 A1 | 9/2012 | Morey | |
| 2013/0206490 A1* | 8/2013 | Kouvo | H02J 7/34 180/65.1 |
| 2013/0313351 A1 | 11/2013 | Beam, III | |
| 2014/0084091 A1* | 3/2014 | Schwelling | B02C 25/00 241/28 |
| 2014/0333237 A1 | 11/2014 | Stockstill | |
| 2016/0126740 A1 | 5/2016 | Lu et al. | |
| 2019/0291120 A1* | 9/2019 | Lindner | B02C 18/24 |

FOREIGN PATENT DOCUMENTS

| | | | |
|---|---|---|---|
| CN | 105610358 | A | 5/2016 |
| DE | 102005062963 | A1 | 7/2007 |
| DE | 102008061734 | A1 | 6/2010 |
| EP | 2759345 | A1 | 7/2014 |
| JP | 2004148241 | A | 5/2004 |
| WO | 2014039603 | A1 | 3/2014 |

OTHER PUBLICATIONS

International Search Report issued for corresponding International Patent Application No. PCT/EP2017/062401 dated Nov. 16, 2017.

Written Opinion issued for corresponding International Patent Application No. PCT/EP2017/062401 dated Nov. 16, 2017 (English language translation not attached).

Third Office Action issued by the Chinese Patent Office for Chinese Patent Application No. 201780034518.9, dated Aug. 4, 2021.

Search Report issued by the Chinese Patent Office for Chinese Patent Application No. 201780034518.9, dated Jul. 29, 2021.

* cited by examiner

STATIONARY WASTE COMMINUTING DEVICE HAVING AN ENERGY ACCUMULATOR

FIELD OF INVENTION

The invention relates to a stationary waste shredding device having at least one shredding shaft, at least one electric motor for driving the at least one shredding shaft and a mains connection for supplying the stationary waste shredding device with electrical energy.

In all the following descriptions, both of the state of the art and of the description of the invention, only one component of the system is cited for simplification purposes. Of course, two or more components can be present or provided in the system. For example, a shredding shaft or a generator or electric motor is always cited. Depending on the shredding system, there may also be two or more shredding shafts. Also with regard to the drive components, it can be several combustion engines, generators, electric motors or energy stores and other multiple components.

STATE OF THE ART

Waste shredding devices designed for stationary operation may include, for example, a diesel engine or an electric motor to drive a shredding shaft.

In the case of an electric drive of the shredding shaft, a connection for a mains is provided. The stationary waste shredding device is then operated exclusively with electrical energy from the mains. However, because fluctuations in the demand for electrical energy occur during operation of the waste shredding device, e.g. because solid and soft material to be shredded is mixed or because the force to be applied for shredding depends on the random orientation of the material on the shredding shaft, peak loads can occur which in some cases are significantly higher than the average load. Such load peaks must be provided by the electric motor or the electrical energy/power supplied to the electric motor from the mains.

Likewise, the starting current at the start, which can be up to four times the nominal current of the electric motor, has a negative effect on the total energy costs of such a shredding system.

According to the state of the art, attempts are made to counter these negative aspects by so-called switching devices for soft start or by frequency converters. This is only possible to a very limited extent. These switching devices are also not very popular with grid operators, as they can lead to "contamination" of the grid through the generation of so-called harmonics.

This state-of-the-art procedure is disadvantageous in that it requires more cost-intensive tariffs to be agreed with electricity grid operators, which not only provide the average but also the maximum power consumption. These tariffs are independent of how often the maximum capacity is withdrawn. Comparatively high costs must therefore be incurred for tariffs with high capacity, even if the maximum capacity is only rarely called up.

It should also not be overlooked that this is not only about the costs of the so-called work or service price. In many cases, the capacity of the mains for the drive power of such stationary shredders is not available at certain locations. In addition, the power provided is measured according to the greatest power requirement. In the case of such a shredder, according to the starting current and the peak load of the shredding process. For this very high power requirement, the one-off costs for the mains connection and thus for the supraregional network expansion and the ongoing costs for the capacity provided are calculated. In addition to the costs of the so-called working price, there are also the costs of the so-called performance price, which is predominantly calculated on the basis of the highest 15 minutes of electricity volume of purchased electricity in a month.

In addition to these costs, the additional costs of the so-called hardware are also not insignificant. Both the transformer equipment or the provision of a diesel generator if the power supply is not from the network, the switchgear and fuse systems, as well as the cable connections, must be designed for the maximum peak current occurring, which causes considerable costs.

DESCRIPTION OF THE INVENTION

The invention is therefore based on the object of at least partially overcoming the above-mentioned disadvantages, thus considerably reducing the actually required connected load of the mains, and avoiding or mitigating as far as possible the power peaks occurring due to the starting current of the electric motor and the load peaks caused by the shredding process itself.

This object is solved by a stationary waste shredding device according to claim 1. Advantageous further embodiments are defined in the dependent claims.

The stationary waste shredding device according to the invention comprises at least one shredding shaft, at least one electric motor for driving the at least one shredding shaft, a power network connection for supplying the stationary waste shredding device with electrical energy and an energy store for storing energy and for at least partially supplying the at least one electric motor with electrical energy, in particular for covering power peaks. This has the advantage that the proportion of load peaks exceeding the rated power does not have to be covered by the power from the mains, but is provided by the energy store. Such power peaks can also occur when starting the waste shredding device in the form of a starting current. The invention makes it possible to provide less power from the power network than, for example, when a portion of the power peaks exceeding the nominal power would have to be drawn from the mains. Accordingly, even a weak power network is subject to less load, which means that grid failures can be avoided.

An embodiment of the stationary waste shredding device according to the invention consists in the fact that at least one transmission or one transmission belt drive can be provided between the at least one electric motor and the at least one shredding shaft. With the transmission or transmission belt drive, a connection between electric motor and shredding shaft and/or a load distribution via a drive to several shredding shafts, e.g. via a synchronous transmission, can optionally take place.

Another embodiment of the stationary waste shredding device according to the invention consists in the fact that it can further comprise: an AC/DC converter for converting alternating current from the mains connection to direct current, a DC/AC converter for converting direct current to alternating current for the at least one electric motor, and an intermediate circuit arranged between the AC/DC converter and the DC/AC converter with an energy management module for coupling the energy store, wherein each electric motor is an alternating current motor. In this way, an AC motor can be supplied both with energy from the mains and from the energy store.

Another embodiment of the inventive stationary waste shredding device is that it may further comprise: an AC/DC converter for converting alternating current from the mains connection to direct current and an intermediate circuit arranged between the AC/DC converter and the at least one electric motor with an energy management module for coupling the energy store, each electric motor being a direct current motor. In this way, a DC motor can be supplied both with energy from the mains and from the energy store.

Another embodiment of the stationary waste shredding device according to the invention is that it may further comprise: a charger provided between the mains connection and the energy store for charging the energy store, wherein the energy store is provided for completely supplying electrical energy to the at least one electric motor, wherein, if each electric motor is an AC motor, further a DC/AC converter for converting direct current to alternating current is provided for the at least one electric motor. In this embodiment, the electric motor is operated only with energy from the energy store, the energy store being charged or recharged with energy from the mains, in particular continuously when the waste shredding device is operated.

The stationary waste shredding device according to the invention or one of its embodiments may further comprise a control device for controlling the flow of energy between the mains connection, the at least one electric motor and the energy store. Such a control device controls the storage of energy and the supply of the individual components of the waste shredding device.

The control device can be further developed to limit the maximum power drawn from the mains connection to the rated power and/or to release a starting process of the waste shredding device only when a minimum amount of energy is contained in the energy store, and/or after the starting process of the waste shredding device to release the driving of the at least one shredding shaft only when the minimum energy quantity is contained in the energy store, and/or to control the energy supply from the energy store to the at least one electric motor to cover the power peaks exceeding the rated power of the mains connection, and/or when periods of low load demand occur in which a power consumption of the at least one electric motor falls below the rated power of the mains connection, to use a difference between the rated power and the power consumption of the at least one electric motor for charging the energy store, and/or to operate the at least one electric motor as a generator during a braking operation of the at least one shredding shaft and to use the power produced thereby for charging the energy store, and to feed the power produced during the braking operation into the mains via the mains connection when the energy store is fully charged.

The energy store of the stationary waste shredding device can comprise at least one electrical energy store and/or a mechanical energy store, wherein the electrical energy store can comprise in particular a rechargeable battery and/or a capacitor (e.g. supercapacitor, SuperCAP) and/or a superconducting magnetic energy store, and/or a static uninterruptible power supply (static UPS) and/or wherein the mechanical energy store can comprise in particular a dynamic uninterruptible power supply (dynamic UPS) and/ or a flywheel mass store and/or a flywheel mass store.

In the case of a mechanical energy store, the waste shredding device may include a conversion device for converting electrical to mechanical and mechanical to electrical energy.

The stationary waste shredder according to the invention or one of its further developments may, in particular, have two or more shredding shafts each with one electric motor or with a common electric motor. Accordingly, the stationary waste shredder may be, for example, a 2-, 3- or 4-wave shredder.

The above-mentioned object is also solved by a method according to claim 11. Advantageous further developments are defined in the claims dependent on it. With regard to the advantages of the method according to the invention and its further developments, reference is made to the corresponding explanations with regard to the waste shredding device according to the invention and its further developments.

The method according to the invention of operating a stationary waste shredding device (wherein the stationary waste shredding device comprises at least one shredding shaft, at least one electric motor, a mains connection and an energy store) comprises the following steps: supplying the stationary waste shredding device with electrical energy via the mains connection; storing energy in the energy store; driving the at least one shredding shaft with the at least one electric motor; and at least partially supplying the electric motor with electrical energy from the energy store, in particular supplying the electric motor with electrical energy from the energy store to cover a proportion of power peaks exceeding a rated power of the mains connection.

The method according to the invention can be further developed in such a way that the further step of controlling the energy flow between the mains connection, the at least one electric motor and the energy store is provided.

This can be further developed in such a way that the method further comprises: limiting the maximum power taken from the mains power connection to the rated power, and/or starting the waste shredding device when a minimum amount of energy is contained in the energy store, and/or driving the at least one shredding shaft after the starting operation of the waste shredding device when the minimum amount of energy is contained in the energy store, and/or controlling the energy supply from the energy store to the at least one electric motor to cover the power peaks exceeding the rated power of the mains connection, and/or charging the energy store when periods of low load demand occur in which a power consumption of the at least one electric motor falls below the rated power of the mains connection, by using a difference between the rated power and the power consumption of the at least one electric motor, and/or operating the at least one electric motor as a generator during a braking operation of the at least one shredding shaft and using the power produced in this case to charge the energy store, and/or feeding the power produced during a braking operation of the at least one shredding wave via the mains connection into the mains supply, in particular when the energy is fully charged.

According to another further development, the following further steps may be provided: converting alternating current from the mains connection to direct current, using at least a part of the direct current to store energy in the energy store, and converting direct current to alternating current to supply energy from the mains connection and/or energy from the energy store to the at least one electric motor formed in the form of an alternating current motor.

Another further development consists in that the steps of converting alternating current from the mains connection to direct current, using at least a part of the direct current for storing energy in the energy store, and supplying energy from the mains connection and/or energy from the energy store to the at least one electric motor formed in the form of a direct current motor can be provided.

According to another further embodiment, the following further steps may be provided: charging the energy store with energy from the mains connection and fully supplying the at least one electric motor with electrical energy from the energy store.

Further features and embodiments as well as advantages of the present invention are explained in more detail in the following drawing. It goes without saying that this embodiment cannot exhaust the entire scope of this invention. It also goes without saying that some or all of the features described below can also be combined in other ways.

EMBODIMENTS

The embodiments described in the following are only examples for the solution of the object. Other embodiments are conceivable to pursue the objectives of the invention.

Figure 1:
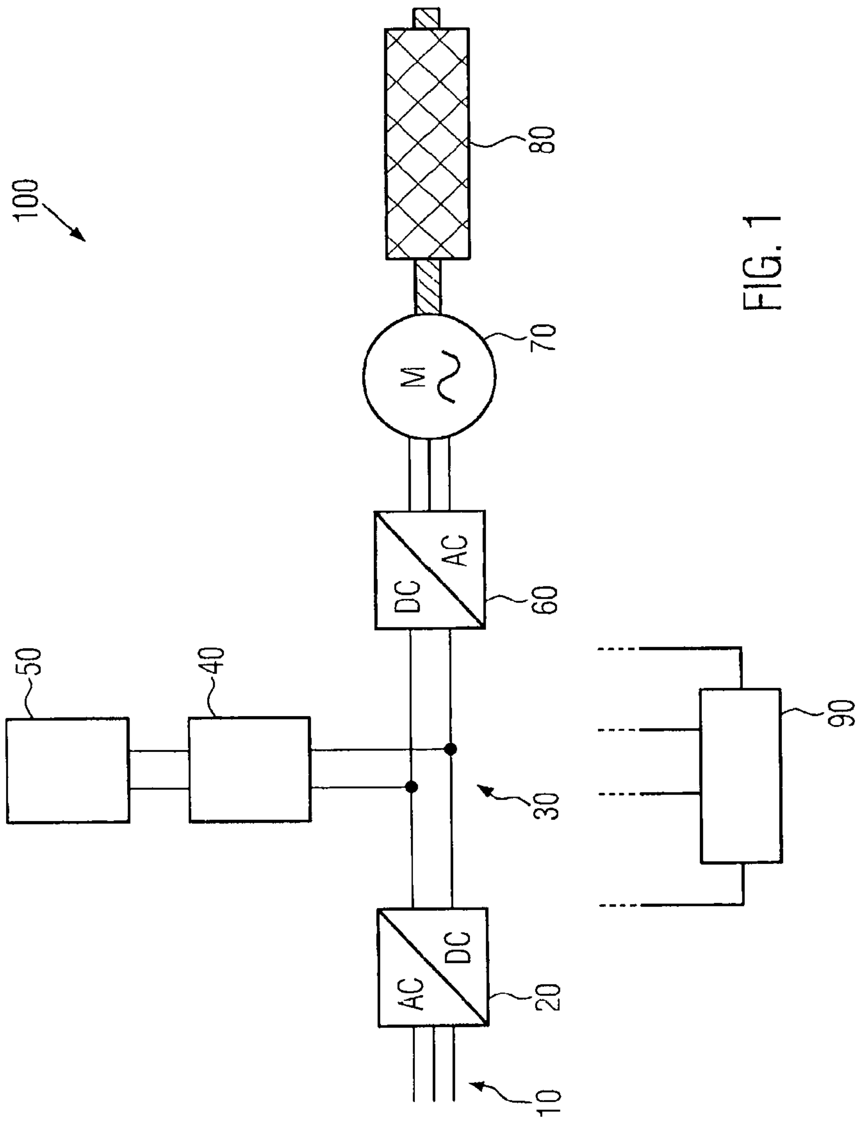
FIG. 1 shows a first embodiment of the stationary waste shredding device according to the invention.

FIG. 1 shows a first embodiment 100 of the stationary waste shredding device according to the invention.

The stationary waste shredding device according to the invention comprises at least one shredding shaft 80, at least one electric motor 70 for driving at least one shredding shaft 80, and a mains connection 10 and energy store 50 for supplying the stationary waste shredding device with electrical energy.

The stationary waste shredding device according to the invention is essentially characterized by an energy store 50 for storing energy and for supplying the at least one electric motor 70 with electrical energy for partially covering the power peaks exceeding the nominal load of the mains connection 10, caused by the load peaks of the shredding process.

Figure 3:
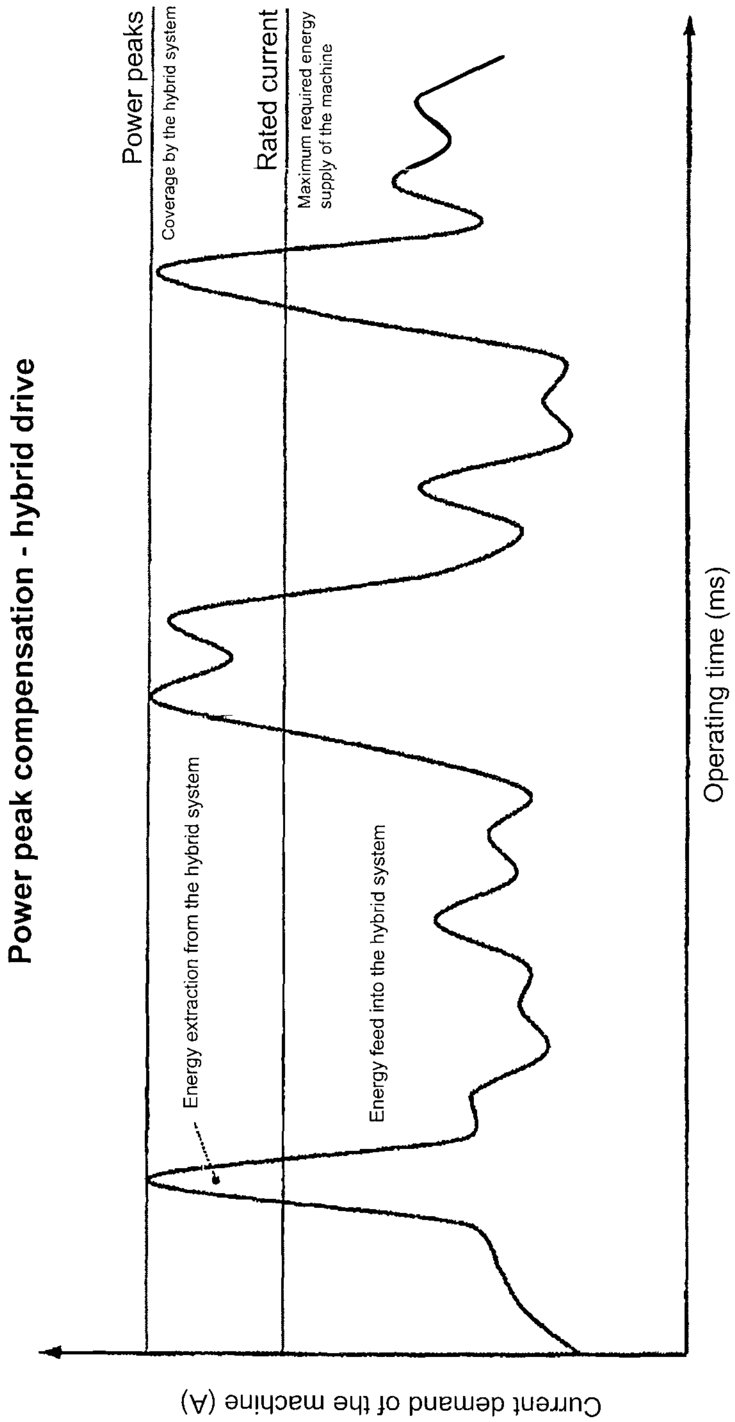
FIG. 3 shows a graphic with load peaks and periods of low load demand.

As can be seen from the graphic shown in FIG. 3, the shredding process takes place with strongly changing torques and thus strongly changing power consumption of the electric motor 70. The graphic clearly shows so-called load peaks and periods of low load demand. In the embodiment according to the invention, the nominal power of the system and thus the mains connection 10, will preferably be designed in the middle between the load peaks and periods of low load demand to be expected.

As the mains connection 10 cannot cover the load peaks exceeding the nominal power of the mains connection, additional energy must be supplied to the shredding system. This energy, which is required to cover this additional energy, is made available by the energy store 50. The power supply from the mains is preferably in the size of the nominal power of the embodiment.

The additional power required to cover the part of the load peaks exceeding the nominal current is thus provided by the energy store 50 and made available by the electric motor 70 of the shredding shaft 80 as additional power to the power supply from the mains.

Since the share of load peaks exceeding the nominal power does not have to be covered by the power from the mains 10, but is provided by the energy store 50, a smaller power provided by the mains is possible than if the share of load peaks exceeding the nominal current had to be drawn from the mains 10.

The electrical energy store 50 in the embodiment 100 is connected to the intermediate circuit 30. The electrical energy store can be a capacitor in the form of a so-called SuperCAP, a battery or accumulator of various design or system, or an electrical flywheel store or a similar electrical or mechanical energy store. In this case, a corresponding energy management module 40 for the energy store 50 for loading and unloading is provided directly in front of the energy store or in the overall control system.

A combination of several identical or several different energy stores is also possible. For example, a battery energy store for the starting process and covering of the starting current exceeding the nominal current from the electric motor of the shredder 100 and a capacitor for covering the short-term load peaks.

When periods of low load demand occur again, as shown in the graphic in FIG. 3, the energy store 50 is recharged via the mains 10 up to the level of the appropriate current volume, so that the stored energy is available for further covering of load peaks.

If the operation of such a shredding system shows that the so-called periods of low power consumption for recharging the energy store 50 from the mains are not sufficient, the energy store 50 can also be recharged by a separately arranged internal combustion engine with attached generator, which also delivers its power via an AC/DC converter into the intermediate circuit 30.

With the embodiment according to the invention, it is also very easy to adapt the speed of the shredding shaft 80 to the actual shredding task via the electric motor 70. Such adjustment of the speed may also be necessary in connection with the capacity of the energy store 50. If the ratio of the load peaks, i.e. an increased energy demand from the energy store 50, to the periods of low energy demand, i.e. the recharging of the energy store 50 from the mains, should not be sufficient to continuously charge the energy store 50, the speed of the motor 70 and thus the shredding shaft 80 can be adjusted so that the ratio of the load peaks to the periods of low load demand is adjusted in such a way that a continuous charging of the energy store 50 is ensured, even if this is associated with a reduction in the throughput capacity.

These stationary shredders described here are also operated for a very short time at certain time intervals, or after certain events have occurred, even in reverse operation, i.e. in a changed direction of rotation of the motor 70 and the shredding shaft 80. One such event that gives rise to a change in the direction of rotation is, for example, the fact that the feed material before the shredding shaft has become so compressed that there is no actual shredding and thus the throughput rate is greatly reduced.

To remedy this, it is necessary to reverse the direction of rotation of the shredding shaft 80 for a short preset time. This loosens up the feed material, which can then be shredded again with sufficient throughput during subsequent normal operation.

In order to initiate this reversing process, however, it is first necessary to bring the motor 70 with the shredding shaft 80 to a standstill. To keep the time required for this as short as possible, the engine 70 is switched from engine operation to generator operation. In generator operation, the braking energy can be used to charge the store 50 until the shredding shaft 80 comes to a standstill, and if its capacity is exhausted, the braking energy is fed back into the mains against reimbursement of costs.

Another cause of the peak load on the mains 10 is the starting current at the start of the electric motor 70 of this stationary shredder. In general, this starting current is approximately four times the rated current. If this additional starting current has to be drawn from the mains, the current connection must be designed to be larger than the starting current exceeding the rated power.

Therefore, the invention is also based on the object of covering the starting current of the electric motor exceeding the nominal current from the energy store 50 and not from the mains 10. This means that the mains connection and the upstream supply, switching and securing devices and cable connections only need to be made in the size of the nominal current of the electric motor, which means considerable cost savings both in the installation of such a power connection and also in the operation of the shredder itself.

A complex control 90 with extensive software is provided for controlling the shredding device 100 according to the invention in order to solve the object underlying the invention. This control must take over the task that never a higher power than the specified nominal power is taken from the mains 10, and that before the actual starting process of the electric motor 70 sufficient capacity of the energy store 50 is available. After the starting process, the control 90 must not release the actual shredding process until the energy store 50 has sufficient capacity again after the starting process. In the shredding process itself, the control 90 must ensure the process control of the additional energy supply from the energy store 50 to the mains power 10 to the electric motor 70 to cover load peaks up to its permissible maximum power. Conversely, when periods of low load demand occur, the control 90 must ensure that the energy store 50 is charged from the difference between the nominal power 10 of the mains supply and the actual current consumption of the electric motor 70. The control 90 must have a corresponding influence on the AC/DC converter 20, DC/AC converter 60 and on the energy store management 40, unless one of these components is already integrated in the controller 90, so that there is no overcharging or impermissible discharge of the energy store 50.

The energy store 50 of the stationary waste shredding device 100 can, for example, consist of a battery or an accumulator, preferably using lithium-ion cells. The embodiment 100 also includes an AC/DC converter 20, which converts the mains current, preferably 400 V alternating current, into a direct current of the intermediate circuit 30 with 200-800 V, preferably 650 V. An energy management module 40 is connected to this intermediate circuit, which controls the charging and discharging of the energy store 50. The DC/AC converter 60 or frequency converter, which provides the alternating current at the specified frequency to the electric motor 70 for driving the shredding shaft 80, is also connected to the intermediate circuit 30.

Figure 2A:
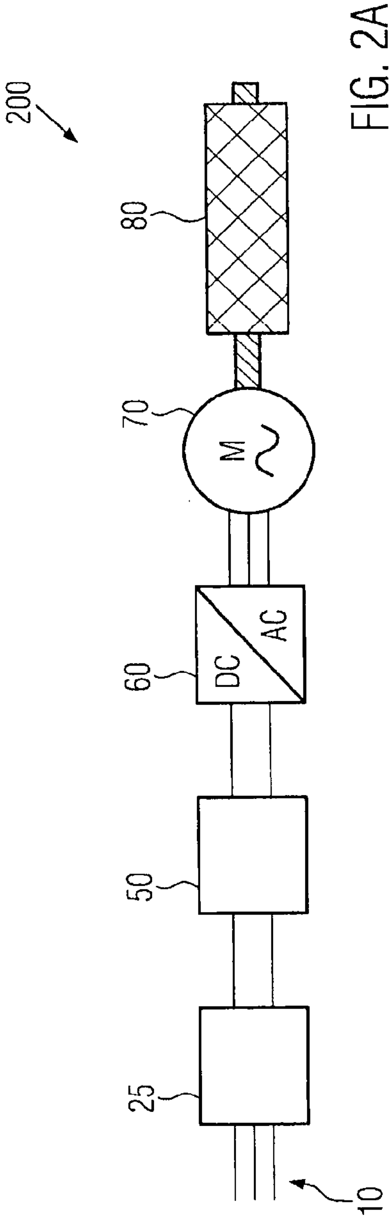
FIG. 2 shows a second embodiment of the invention of the stationary waste shredding device.
Figure 2B:
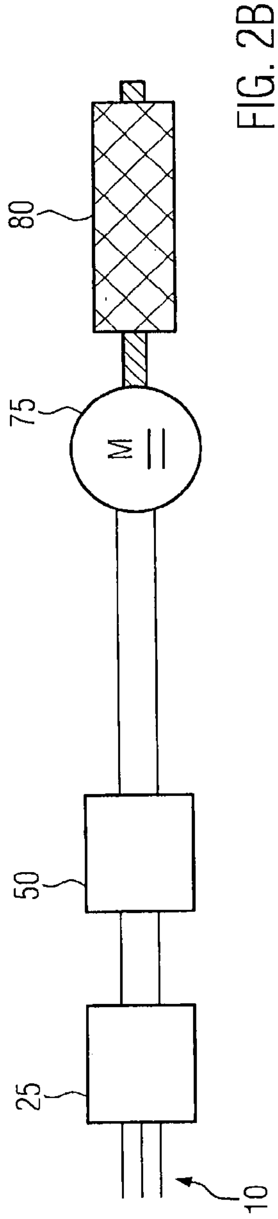

FIG. 2 shows a second embodiment 200 of the stationary waste shredding device according to the invention.

In the first embodiment 100, the energy store 50 is arranged in such a way that it receives 40 energy from an intermediate circuit 30 via the energy management system and releases it into this circuit again. The capacity of this energy store 50 will only be large enough to cover only the peak loads which lie above the average between peak loads and periods of low load demand. The required capacity will be relatively small.

The second embodiment 200 provides for the energy store 50, primarily designed as a battery or accumulator, in the main power supply line of the motor 70. The battery is continuously fed and charged from the mains 10 via the charger 25. Via a DC/AC converter 60, the power is transferred back to the motor 70, which drives the shaft 80.

The motor 70 also receives the power required to cover the load peaks from the energy store or the battery 50. However, only that power is supplied to the energy store unit which corresponds to the center between the load peaks and load valleys to cover the required power.

In the case of periods with low load demand, where the energy requirement of the motor 70 is below the above-mentioned center between load peaks and periods of low load demand, the energy store or battery 50 can be recharged by the energy previously taken to cover the load peaks.

In addition to the use of an AC motor 70 (FIG. 2A) with an upstream DC/AC converter 60, a further version with a DC motor 75 (FIG. 2B) for driving the shaft 80 is conceivable, whereby the converter 60 is then unnecessary.

With this embodiment according to FIG. 2, the same effect is achieved as with the embodiment 100, i.e. the network 10 is only loaded to the extent corresponding to the required power between the load peaks and periods of low load demand.

The additional energy required to cover the load peaks and the power required to apply the starting current of the motor 70 or 75 are covered by the energy store or battery 50. Therefore, the capacity of the energy store 50 in the second embodiment 200 must be designed according to FIG. 2 for the full power of the motor 70 or 75 including the load peaks.

This embodiment according to FIG. 2 may hardly be economically feasible at the current battery costs. However, experience and developments in the battery sector show that costs are likely to decrease by a factor of 10 in 5 years.

Figure 4:
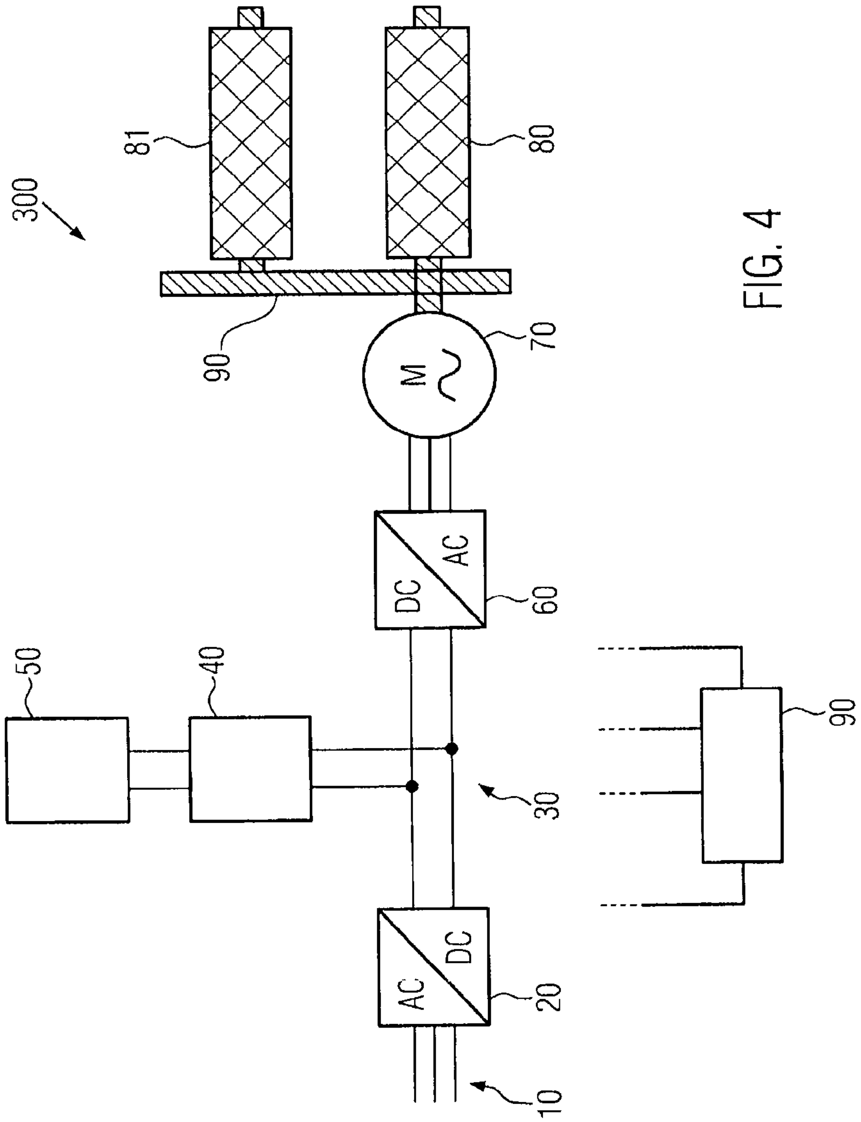
FIG. 4 shows a third embodiment of the stationary waste shredding device according to the invention.

FIG. 4 shows a third embodiment 300 of the stationary waste shredding device according to the invention. This embodiment corresponds to that of FIG. 1, but instead of one shredding shaft in the first embodiment, two shredding shafts 80, 81 are provided here (twin-shaft shredder). The optional connection between the electric motor 70 and the shredding shafts 80, 81 is made via a transmission 90 (for example a synchronous transmission).

The embodiments shown are only exemplary and the complete scope of this invention is defined by the claims.

The invention claimed is:

1. A waste shredding device comprising:

at least one shredding shaft configured to shred feed material;

an electric motor for driving said at least one shredding shaft;

a mains connection for supplying the waste shredding device with electrical energy, wherein the mains connection has a predetermined rated power;

an energy store for storing energy and for at least partially supplying the electric motor with electrical energy for covering power peaks; and a controller for controlling a flow of energy between the mains connection, the electric motor and the energy store, wherein the controller includes a non-transitory computer-readable medium that stores computer code that is executable to:

determine a power requirements for the electric motor, determine the rated power of the mains connection, determine when the power requirements for the electric motor exceed the rated power of the mains connection, control the flow of energy to the energy store, and in response to the determination that the power requirements for the electric motor exceed the rated power of the mains connection, control the flow of energy from the energy store to the electric motor to provide the electric motor with energy from the energy store by at least an amount of which the rated power is exceeded.

2. The waste shredding device according to claim 1, further comprising:

at least one selected from the group comprising a transmission and a transmission belt drive between said electric motor and said at least one shredding shaft.

3. The waste shredding device according to claim 2, further comprising:

an AC/DC converter for converting alternating current from the mains connection to direct current, a DC/AC converter for converting direct current to alternating current for said electric motor, and an intermediate circuit arranged between said AC/DC converter and said DC/AC converter with an energy management module for coupling said energy store, the electric motor being an alternating current motor.

4. The waste shredding device according to claim 2, further comprising:

an AC/DC converter for converting alternating current from the mains connection to direct current, and an intermediate circuit disposed between the AC/DC converter and the electric motor and having an energy management module for coupling the energy store, wherein the electric motor is a direct current motor.

5. The waste shredding device according to claim 2, further comprising:

a charger provided between said mains connection and said energy store for charging said energy store, said energy store being provided for completely supplying said electric motor with electric power, wherein if the electric motor is an AC motor, further a DC/AC converter for converting direct current to alternating current is provided for said electric motor.

6. The waste shredding device according to claim 2, further comprising:

a controller for controlling a flow of energy between said mains connection, said electric motor and said energy store.

7. The waste shredding device according to claim 1, further comprising:

an AC/DC converter for converting alternating current from the mains connection to direct current, a DC/AC converter for converting direct current to alternating current for said electric motor, and an intermediate circuit arranged between said AC/DC converter and said DC/AC converter with an energy management module for coupling said energy store, the electric motor being an alternating current motor.

8. The waste shredding device according to claim 7, further comprising:

a controller for controlling a flow of energy between said mains connection, said electric motor and said energy store.

9. The waste shredding device according to claim 1, further comprising:

an AC/DC converter for converting alternating current from the mains connection to direct current, and an intermediate circuit disposed between the AC/DC converter and the electric motor and having an energy management module for coupling the energy store, wherein the electric motor is a direct current motor.

10. The waste shredding device according to claim 1, further comprising:

a charger provided between said mains connection and said energy store for charging said energy store, said energy store being provided for completely supplying said electric motor with electric power, wherein if the electric motor is an AC motor, further a DC/AC converter for converting direct current to alternating current is provided for said electric motor.

11. The waste shredding device according to claim 1, wherein the controller further configured to at least one selected from the group comprising (i) limit a maximum power drawn from the mains connection to a rated power, (ii) release a starting process of the waste shredding device only when a minimum amount of energy is contained in the energy store, (iii) release driving of the at least one shredding shaft after a starting process of the waste shredding device only when a minimum amount of energy is contained in the energy store, (iv) when periods of low load demand occur in which a power consumption of the electric motor falls below the rated power of the mains connection, to use a difference between the rated power and a power consumption of the electric motor for charging the energy store, and (v) operate the electric motor as a generator during a braking operation of the at least one shredding shaft and to use power generated thereby for charging the energy store and, when the energy store is fully charged, to feed power generated during a braking operation into a mains system via the mains connection.

12. The waste shredding device according to claim 1, wherein the energy store comprises at least one selected from the group comprising (i) an electrical energy store and (ii) a mechanical energy store;

wherein the electrical energy store comprises at least one selected from the group comprising (a) a rechargeable battery, (b) a capacitor, and (c) a superconducting magnetic energy store, and (d) a static uninterruptible power supply (UPS); and wherein the mechanical energy store comprises at least one selected from the group comprising (x) a dynamic UPS, (y) a flywheel mass store, and (z) a flywheel store.

13. The waste shredding device according to claim 12, wherein the energy store comprises the mechanical energy store, and the waste shredding device further comprises a converter for converting electrical energy to mechanical energy and mechanical energy to electrical energy.

14. The waste shredding device according to claim 1, wherein the at least one shredding shaft further comprises two or more shredding shafts each shredding shaft being driven by the electric motor or each shredding shaft being driven by respective one of a plurality of electric motors.

15. A method of operating a waste shredding device, the waste shredding device comprising at least one shredding shaft configured to shred feed material, an electric motor, a mains connection and an energy store, the method comprising the following steps:

supplying the waste shredding device with electrical power via the mains connection, wherein the mains connection has a predetermined rated power;

storing energy in the energy store;

driving the at least one shredding shaft with the electric motor;

at least partially supplying the electric motor with electrical energy from the energy store to cover power peaks; and controlling, via a controller, a flow of energy between the mains connection], the electric motor and the energy store, wherein the controller includes a non-transitory computer-readable medium that stores computer code that is executable to:

determine a power requirement for the electric motor, determine the rated power of the mains connection, determine when the power requirements for the electric motor exceed the rated power of the mains connection, control the flow of energy to the energy store, and in response to the determination that the power requirements for the electric motor exceed the rated power of the mains connection, control the flow of energy from the energy store to the electric motor to provide the electric motor with energy from the energy store by at least an amount of which the rated power is exceeded.

16. The method according to claim 15, further comprising at least one selected from the group comprising (i) limiting a maximum power drawn from the mains connection to a rated power, (ii) starting the waste shredding device when a minimum amount of energy is contained in the energy store, (iii) driving the at least one shredding shaft after a starting process of the waste shredding device if a minimum amount of energy is contained in the energy store, (iv) charging the energy store when periods of low load demand occur in which a power consumption of the electric motor falls below the rated power of the mains connection, by using a difference between the rated power and a power consumption of the electric motor, (v) operating the electric motor as a generator during a braking process of the at least one shredding shaft and using power generated thereby for charging the energy store, and (vi) feeding power generated during a braking operation of the at least one shredding shaft via the mains connection into a mains system when the energy store is fully charged.

17. The method according to claim 15, comprising the further steps:

converting alternating current from the mains connection to direct current, using at least a part of the direct current to store energy in the energy store, and converting direct current to alternating current to supply energy to the electric motor configured in a form of an alternating current motor from at least one selected from the group comprising (a) the mains connection and (b) energy from the energy store.

18. The method according to claim 15, comprising the further steps:

converting alternating current from the mains connection to direct current, using at least a part of the direct current for storing energy in the energy store, and supplying energy to the electric motor configured in a form of a direct current motor from at least one selected from the group comprising (i) the mains connection and (ii) energy from the energy store.

* * * * *